May 12, 1959 R. L. LOGAN Re. 24,647

SOCKET FOR STUDIO LAMP OR THE LIKE

Original Filed Dec. 20, 1954

INVENTOR.
RALPH L. LOGAN
BY Ernest Hilly
ATTORNEY

United States Patent Office

Re. 24,647
Reissued May 12, 1959

24,647

SOCKET FOR STUDIO LAMP OR THE LIKE

Ralph L. Logan, Los Angeles, Calif., assignor to J. G. McAlister, Inc., Hollywood, Calif., a corporation of California Original No. 2,774,050, dated December 11, 1956, Serial No. 476,436, December 20, 1954. Application for reissue June 23, 1958, Serial No. 745,793

12 Claims. (Cl. 339—75)

Matter enclosed in heavy brackets [ ] appears in the original patent but forms no part of this reissue specification; matter printed in italics indicates the additions made by reissue.

This invention relates generally to lamp sockets and more particularly to an improved lamp socket for use in studio and flood lamps such as are employed for set illumination in motion picture and television studios.

The light globes generally employed in lamps of the above type are of relatively high wattage and comprise a large glass envelope enclosing the filaments and a bi-post form of base structure including extending posts or prongs which are connected at their inner ends to the filaments.

Heretofore, the sockets for such lamps have generally assumed two forms, each of which forms included a pair of longitudinally split socket elements disposed within the lamp socket housing for receiving the posts extending from the base of the light globe. In one of these prior socket arrangements, the posts of the light globe were retained within the split socket elements by screws, or other positive means, which were manually operated to force the split portions of the socket elements together whereby to clamp the light globe posts therebetween.

In another prior lamp socket arrangement, the split portions of the socket elements were urged together by springs, or the like, and the light globe was inserted in the lamp socket by axially forcing of the light globe posts into the socket elements whereby the split portions of the latter would be separated against the action of the springs.

Owing to the relatively high temperatures at which the light globes operate, substantial expansion is produced in the parts of the lamp socket. Because of this expansion of parts, the prior socket arrangements employing positive means for clamping the light globe prongs in the split socket elements have proved to be unsatisfactory. Thus, after the lamp had been operated a few times, expansion and contraction of the parts would cause loosening of the light globe posts in their socket elements with the resultant possibility of accidental separation of the light globe from the socket where the lamp was tilted or inverted. This, of course, would create not only an inconvenience but also a safety hazard to personnel.

Moreover, carelessness on the part of personnel inserting the globe might result in the globe not being properly secured in the socket owing to insufficient drawing up of the clamping screws.

The foremost disadvantage of such loosening of the light globe posts was, however, the possibility of the creation of an arc between the posts, which are of relatively thin tubular construtcion, and the socket elements. Such electrical discharges would, within a short period of time, eat through the thin walls of the posts, which have their interior in communication with the interior of the globes, with the resultant admission of air to such interior and hence destruction of the globe filaments.

While those prior socket arrangements employing spring biased split socket elements effectively avoided the above disadvantages of the positively clamped split socket arrangements, owing to the ability of the springs to maintain firm contact between the split socket portions and the posts, the spring tension necessary was relatively high. Substantial axial force was, therefore, required to insert the light globe posts into their socket elements with the resultant creation of an extreme safety hazard to personnel due to the possibility of the relatively thin glass envelope of the globe collapsing under such force.

Accordingly a general object of this invention is the provision of an improved lamp socket for use in studio or flood lamps.

Another object of the invention is the provision of such a lamp socket, for use with a light globe having a bi-post base structure, which is effective to maintain the posts of the light globe securely clamped within their socket elements over substantially unlimited periods of time whereby to effectively eliminate the possibilities of destruction of the light globe due to the formation of arc discharges between the posts and socket elements, and accidental separation of the globe from the socket.

A further object of the invention is the provision of a lamp socket as in the foregoing wherein insertion of the light globe into the socket may be readily accomplished with a minimum of applied force whereby to substantially eliminate the possibility of globe breakage and which is not susceptible to improper securing of the globe in the socket by careless personnel.

The invention will be more fully understood from the following detailed description thereof, reference for this purpose being had to the accompanying drawings wherein.

Figure 1:
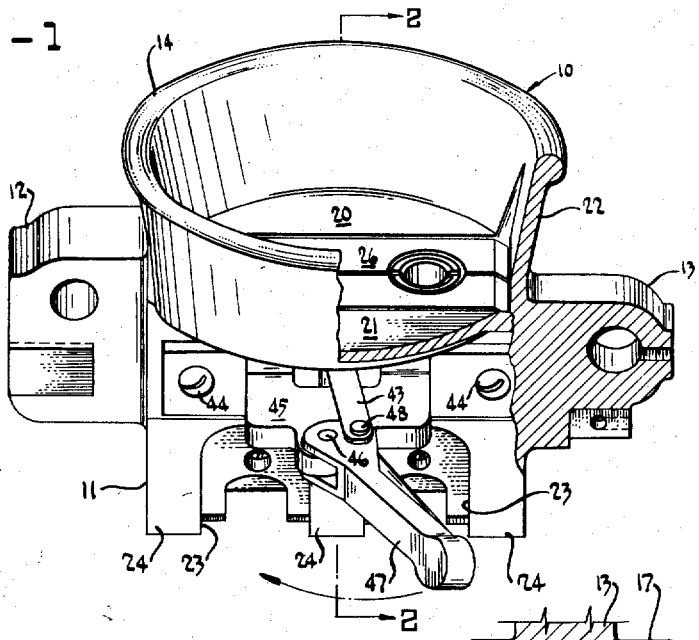
Fig. 1 is a perspective view of a preferred embodiment of the present lamp socket with parts thereof broken away for the sake of clarity.

As viewed in Fig. 1 of the drawing, the present lamp socket comprises generally a body portion 10 including a lower hollow rectangular portion 11, having ears 12 and 13 extending from opposite faces thereof, and an upper, generally cup-shaped portion 14.

Figure 3:
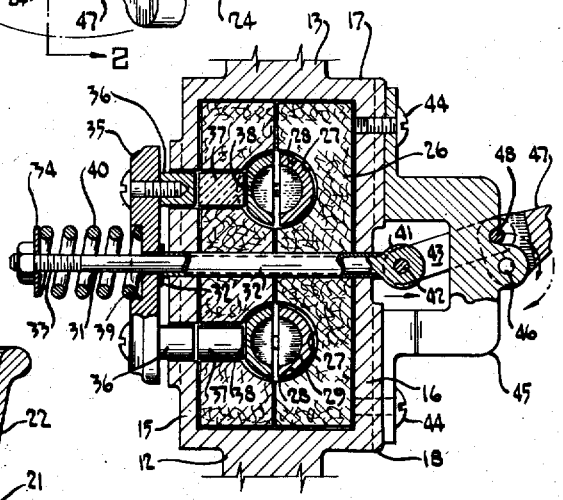
Fig. 3 is a section taken along line 3—3 of Fig. 2.
Figure 2:
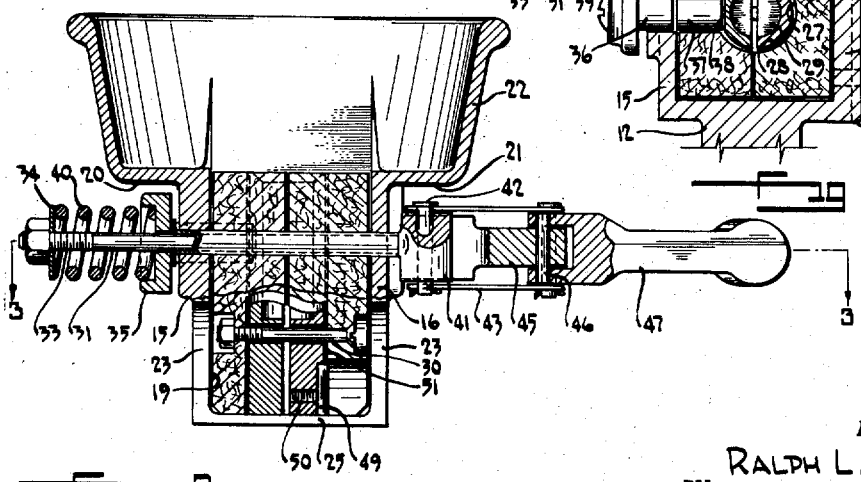
Fig. 2 is a section taken along line 2—2 of Fig. 1.

Lower rectangular portion 11 comprises, as shown more clearly in Figs. 2 and 3, a pair of spaced parallel side walls 15 and 16 and a pair of spaced parallel end walls 17 and 18, the latter having said ears 12 and 13 projecting therefrom. Side walls 15 and 16 and end walls 17 and 18 define therebetween a rectangular chamber 19 open at its upper end as shown in Fig. 2.

Upper cup-shaped potrion 14 of body 10 comprises a pair of generally sector-shaped bottom portions 20 and 21 extending laterally of side walls 15 and 16, respectively, along the upper edges of the latter and an inverted conical wall 22 which merges, at its lower end with the outer peripheries of sector portions 20 and 21 and with the upper ends of end walls 17 and 18, as shown.

Side walls 15 and 16 of rectangular portion 11 are formed with spaced slots 23 opening through their lower edges whereby to provide, in effect, three spaced leg portions 24 on each side wall. The corresponding leg portions 24 of the two side walls are joined at their lower ends by straps 25 extending across the bottom of chamber 19.

The aforedescribed body 10 of the lamp socket may be in the form of an integral casting, as illustrated, or, if desired, may be constructed of separable portions welded or otherwise joined together. Ears 12 and 13 are provided with bores and are notched in a conventional manner, as shown, to provide for mounting of the socket within a lamp housing, not shown.

Loosely fitted in chamber 19 and resting on straps 25 is a block of insulating material 26, such as some form of asbestos, capable of withstanding the high temperatures encountered in studio and flood lamps. Block 26 has formed therethrough a pair of spaced, parallel bores 27, extending parallel to walls 15 through 18, for receiving a pair of socket elements 28 for receiving posts of a light globe.

The spacing between the center lines of bores 27 is made to correspond substantially to the distance between centers of the posts on the light globe to be inserted thereinto. Moreover, the diameter of bores 27 is made somewhat greater than the diameter of the socket elements 28, as shown, so as to accommodate for slight variations in post spacing by lateral movement of the socket elements in the bores. Insulating block 26 may be split along a plane including the axes of bores 27, as illustrated, to accommodate for expansion of the lamp socket parts during lamp operation.

Socket elements 28 have bores 29 axially extending part way therethrough from the upper ends thereof and the socket elements are longitudinally split along a diameter, as clearly shown in Figs. 2 and 3. The arrangement is such that when the posts of a light globe are positioned in bores 29, the split portions of each socket element will be slightly spaced to permit clamping of the posts in the socket elements by forcing of the split sections toward each other. Socket elements 28 are retained in bores 29 by means of recessed bolts 30 extending through insulating block 26 and through enlarged bores in socket elements 28, as shown in Fig. 2.

The novel means of this invention for urging the split portions of the socket elements together comprises a clamp rod 31 axially slidable in a bushing 32 the latter extending slidably through and projecting somewhat beyond side walls 15 and 16 and through insulating block 26. One end of rod 31 is threaded as at 33 for receiving a nut against which abuts a collar or washer 34. Slidably mounted intermediate its ends on clamp rod 31 is a transversely extending clamp bar 35 fixedly carrying adjacent its ends, in outrigger fashion, a pair of cylindrical plungers 36 which are axially movable in bores provided in side wall 15, as shown. Insulating block 26 has provided therethrough a pair of bores in alignment with the above-mentioned side wall bores and having slidably disposed therein a pair of cylindrical spacers 37 of ceramic or other suitable electrically insulating material. Spacers 37 are movable into engagement with flat portions 38 milled, or otherwise formed in the sides of socket elements 28.

Encircling clamp rod 31 between collar 34 and clamp bar 35 and abutting at one end the collar and at the other end the bottom of an annular spring retaining seat 39 formed in the bar 35, is a compression spring 40 whereby upon axial movement of clamp rod 31 to the right, as viewed in Figs. 2 and 3, spacers 37 will be urged against socket elements 28 to force the split portions of the latter together.

To the end that such clamping action may be achieved, clamp rod 31 is formed at its right hand end, as seen in Figs. 2 and 3, with an enlarged apertured portion 41 to which is pivotally secured, as by a pin 42 passing through said aperture, one end of a pair of toggle links 43. Bushing 32 abuts at one end the enlarged portion 41 of rod 31 and at the other end a washer 32' which in turn abuts the clamp bar 35, as shown.

Fixed to side wall 16, as by screws 44, is a generally yoke-shaped support 45, the bight portion of which is straddled by the toggle links 43 as clearly shown in Fig. 2. Pivoted to yoke 45, as by having a bifurcated portion straddling the yoke and a pin 46 extending through the bifurcations and yoke, is a toggle lever 47 having pivotally secured thereto in spaced relation to the lever pivotal axis 46, as at 48, the other ends of the toggle links 43.

The socket elements 28 are cut away as at 49 to provide a flat recessed face and provided with a tapped hole as at 50, accessible through the slots 23 in side wall 16 and alined slots 51 in insulating block 26, to provide means for connecting the socket elements to a source of electrical power, not shown.

The operation of the present lamp socket will be apparent from the foregoing description. The nut on the threaded portion 33 of clamp rod 31 is rotated to provide in the spring 40 a desired initial tension such that upon subsequent operation of the toggle lever, the split portions of the socket elements 28 will be urged together with a desired force. During this initial tensioning of spring 40, clamp bar 35 and washer 32' will be urged against the end of bushing 32. With the toggle lever disposed in the position shown in Fig. 3, the light globe posts may be easily inserted into the socket elements 28, the split portions of the latter now being freely separable to permit such insertion with a minimum of axial force. To cause spacers 37 to be resiliently urged against the split socket elements 28 with a force determined by the initial tension in spring 40, whereby to force the split portions of the latter into clamping engagement with the light globe posts, toggle lever 47 is swung in the direction indicated by the arrows in Fig. 3 to a position wherein pin 48, joining the toggle links 43 to the lever, is past dead center and lever 47 abuts yoke 45. The toggle lever will thus be retained in its clamping position until released.

It will be appreciated that the present lamp socket arrangement provides for relatively free insertion of a light globe so as to substantially eliminate the possibilty of collapse of the light globe envelope during assembly of the globe and socket. Moreover, the toggle and spring assembly for effecting clamping of the light globe posts in the socket assures efficient contact between the posts and socket elements over substantially unlimited periods of time whereby the possibility of destruction of the light globe as a result of arc discharges between the prongs and socket elements or due to accidental separation of the socket and light globe is eliminated without the necessity of frequent and regular inspections of the lamps. The loose mounting of the clamp bar 35 on the clamp rod 31 and the engagement of spring 40 with the bar intermediate the plungers 36 permits limited rocking movement of the bar and assures substantially equal clamping pressures of the spacers 37 against their respective sockets.

Finally, it will be seen that the present socket arrangement precludes improper securing of the light globe in the socket by careless personnel, since unless the toggle lever is swung to its clamping position past dead center it will return to its original position. Thus, it will be immediately apparent to such personnel that the light globe has not been properly clamped in the socket.

It will be readily apparent from the foregoing that the invention is susceptible to numerous modifications in design and arrangement and, therefore, that within the scope of the following claims the invention may be practised otherwise than as specifically described and illustrated herein.

I claim:

1. A lamp socket for use with a light globe of the type having a base and spaced posts extending therefrom, comprising, a hollow body portion, a mass of insulating material within said body portion and including a plurality of parallel bores having a spacing substantially equal to the spacing between the light globe posts, a split socket element within each of said bores for receiving the light globe posts, the transverse dimensions of said socket elements being somewhat less than those of the bores whereby to permit limited lateral movement of the socket elements in the bore; and means for forcing the split portions of the socket elements together whereby to clamp said posts therebetween, comprising an actuating rod movably mounted in the housing, a clamp bar including extensions movable in bores in the housing, spacer elements movable in bores formed in said insulating material in alinement with the second mentioned bores and opening into said first mentioned bores, said spacer elements being engageable with said extensions and with said socket elements, a spring operatively connecting said rod and bar whereby movement of the rod in one direction will cause said spacer elements to be resiliently urged against the socket elements to force the split portions of the latter together, and manually operable means for moving the rod.

2. A lamp socket according to claim 1 wherein said spacer elements are formed of an electrical insulating material.

3. A lamp socket according to claim 1 wherein said manually operable means comprises a toggle lever pivoted to the body portion and toggle links operatively connecting the rod and lever.

4. A lamp socket according to claim 1, and means for providing a desired initial tension in said spring.

[5. A lamp socket for use with a light globe including a base and spaced posts extending from the base, comprising a body portion formed of a one piece casting and including a cup-shaped portion for receiving the light globe base and a hollow portion depending from the under side of the cup-shaped portion and having its interior opening through the bottom of the cup-shaped portion, a block of insulating material within said hollow portion and including a pair of parallel bores opening at one end into said cup-shaped portion and having a spacing substantially equal to the spacing of the light globe posts, a pair of split socket elements in the bores for receiving the light globe posts and having a diameter somewhat less than the diameter of said bores whereby to be capable of limited lateral movement in the bores, said socket elements having means for the connection thereof to a source of electrical power, a clamp rod slidably extending through said hollow portion and the insulating material therein, a transverse clamp bar slidably mounted on the rod, electrically insulating spacer elements movably mounted in alined bores in the wall of the hollow portion and in the insulating material opening into the first mentioned bores and being engageable with the socket elements and clamp bar, a spring operatively connecting the clamp rod and clamp bar whereby movement of the rod in one direction will cause said spacer elements to be resiliently urged against the socket elements to force the split portions thereof together, and toggle means for moving the rod.]

[6. A lamp socket according to claim 5 wherein said toggle means comprises a toggle lever pivoted to said body portion and toggle links operatively connecting the lever and clamp rod.]

[7. A lamp socket according to claim 5 and means for providing a desired initial tension in said spring.]

[8. A socket for holding a light globe and the like having a base and a pair of spaced parallel posts extending from the base, comprising: a body, a pair of split sockets carried by the body for receiving said posts, clamping means on the body including a clamp bar in a transverse plane of said split sockets and socket engaging means spaced along the bar in said plane for engagement with the split sockets respectively, said bar being rockable in said plane and movable toward said split sockets for moving said socket engaging means into forced engagement with their respective split sockets for forcing the split portions thereof together, a spring operatively engaged at one end with said bar intermediate said socket engaging means, and means carried by the body for releasably tensioning said spring to resiliently urge said bar toward the split sockets.]

[9. The subject matter of claim 8 wherein said last mentioned means comprises means movably supporting said bar and spring on the body for movement thereof as a unit toward and away from said split sockets, said bar being movable on said supporting means toward and away from said split sockets and being biased on the supporting means in the direction of the split sockets by said spring, stop means on said supporting means for limiting the movement of the bar relative to the support in said direction, means on the supporting means engaging the other end of the spring and being adjustable to provide an initial tension in the spring with the bar engaged with said stop means, and means for moving said supporting means toward the split sockets to first bring said sockets engaging means into engagement with the split sockets and thereafter increase the tension in the spring above said initial tension.]

[10. The subject matter of claim 9 wherein said means for moving the support means comprises a toggle device.]

*11. A lamp socket for a light globe having a base and a pair of spaced, parallel posts extending from the base, comprising: a hollow metal body open at one side, a block of insulating material in said body having one side exposed through said open side of the body, said block having a pair of first parallel bores opening through said one side of the block, a pair of split post-receiving sockets in said bores, said block and one wall of said body having pairs of aligned, parallel second bores in a transverse plane of and opening to said first bores, clamping means for forcing the split portions of said sockets together including a rigid clamp bar in said transverse plane and having its ends overlying the outer ends of said aligned bores, electrical insulating spacer elements slidable in said second bores of the block and engageable with said split sockets, means engaging between said bar ends and said spacer elements for urging the latter against said split sockets when said bar is moved toward said body, a clamp member rockably connected to said clamp bar intermediate said ends, said member being movable in one direction to move said clamp bar toward said body to a clamping position wherein said spacer elements are urged against the split sockets and in the opposite direction to relieve the pressure of said elements on the split sockets, said clamp bar being rockable in said plane on the member to assure approximately uniform clamping pressure of said elements on said split sockets, and means connected to said body and member for moving the latter in said directions and for locking said clamp bar in its clamping position.*

*12. The subject matter of claim 11 wherein said clamping means further includes yieldable means for resiliently urging said spacer elements against the split sockets.*

*13. A lamp socket for a light globe having a base and a pair of spaced, parallel posts extending from the base, comprising: a hollow metal body open at one side, a block of insulating material in said body having one side exposed through said open side of the body, said block having a pair of first parallel bores opening through said one side of the block, a pair of split post-receiving sockets in said bores, said block and one wall of said body having pairs of aligned, parallel second bores in a transverse plane of and opening to said first bores, clamping means for forcing the split portions of said sockets together including a rigid clamp bar in said transverse plane and having its ends overlying the outer ends of said aligned bores, electrical insulating spacer elements slidable in said second bores of the block and engageable with said split sockets, means engaging between said bar ends and said spacer elements for urging the latter against said split sockets when said bar is moved toward said body, a toggle connection between said body and clamp bar for moving the latter toward the body to and releasably locking the bar in a clamping position wherein said spacer elements are urged against said split sockets, said toggle connection having one link pivoted on said body and a second link, and means rockably connecting said second link to said clamp bar intermediate said ends thereof for rocking of the clamp bar in said plane to assure approximately uniform clamping pressure of said spacer elements on said split sockets.*

*14. A lamp socket for use with a light globe including a base and spaced posts extending from the base, comprising a body portion formed of a one-piece casting and*

*including a cup-shaped portion for receiving the light globe base and a hollow portion depending from the underside of the cup-shaped portion and having its interior opening through the bottom of the cup-shaped portion, a block of insulating material within said hollow portion and including a pair of parallel bores opening at one end into said cup-shaped portion and having a spacing substantially equal to the spacing of the light globe posts, a pair of split socket elements in the bores for receiving the light globe posts and having a diameter somewhat less than the diameter of said bores whereby to be capable of limited alteral movement in the bores, said socket elements having means for the connection thereof to a source of electrical power, said block having a second pair of parallel bores extending transversely of and opening to said first-mentioned bores and through a side of the block, electrically insulating spacer elements slidable on said second pair of bores and engageable with said socket elements, the wall of said hollow portion having a third pair of bores aligned with said second pair of bores, a clamp rod parallel to said second pair of bores and extending slidable through said block and wall, a transverse clamp bar slidably mounted on said rod and overlying said third pair of bores, means on said clamp bar extending loosely through said third pair of bores and engaging said spacer elements, a spring operatively connecting the clamp rod and clamp bar whereby movement of the rod in one direction will cause said spacer elements to be resiliently urged against the socket elements to force the split portions thereof together, and toggle means for moving the rod.*

*15. A lamp socket according to claim 14 wherein said toggle means comprises a toggle lever pivoted to said body portion and toggle links operatively connecting the lever and clamp rod.*

*16. A lamp socket according to claim 14 and means for providing a desired initial tension in said spring.*

*17. A socket for holding a light globe having a base and a pair of spaced, parallel posts extending from the*

*base, comprising a body, a pair of split sockets carried by the body for receiving said posts, a clamp bar in a transverse plane of said split sockets, a clamp member carried on the body and slidably supporting said clamp bar for movement toward and away from said split sockets, a spring acting between said clamp member and clamp bar for biasing the latter on the member in the direction of said split sockets, stop means on the member engageable by the clamp bar for limiting movement of the latter in said direction on the member under the action of said spring, means on the member for adjusting the tension of said spring when said clamp bar engages said stop means, manually operable means acting between said body and clamp member for moving the latter to move said clamp member, spring and stop means as a unit toward and away from said split sockets, and socket engaging means acting between said clamp bar and split sockets to force the split portions of the sockets together when said clamp bar is movd toward said split sockets by said manually operable means.*

*18. The subject matter of claim 17 wherein said socket engaging means are spaced along said clamp bar, and said clamp member comprises a clamp rod slidably supported on the body for axial movement in a direction parallel to said first-mentioned direction and extending loosely through an enlarged hole in the bar intermediate said socket engaging means whereby said bar is capable of limited rocking on the rod in said plane to equalize the clamping pressure on said split sockets.*

References Cited in the file of this patent or the original patent

UNITED STATES PATENTS

| | | |
|---|---|---|
| 1,220,780 | Ovington | Mar. 17, 1917 |
| 1,810,901 | Borman et al. | June 23, 1931 |
| 2,113,852 | Meade | Apr. 12, 1938 |
| 2,175,883 | De Reamer | Oct. 10, 1939 |
| 2,289,172 | Beal | July 7, 1942 |
| 2,774,050 | Logan | Dec. 11, 1956 |